(12) United States Patent
Bozkurt

(10) Patent No.: US 9,056,357 B2
(45) Date of Patent: Jun. 16, 2015

(54) MACHINING TOOL AND METHOD FOR PRODUCING SAME

(71) Applicant: GUEHRING OHG, Albstadt (DE)

(72) Inventor: Lutfi Bozkurt, Winterlingen (DE)

(73) Assignee: Guehring OHG, Albstadt (DE)

( * ) Notice: Subject to any disclaimer, the term of this patent is extended or adjusted under 35 U.S.C. 154(b) by 0 days.

(21) Appl. No.: 13/759,568

(22) Filed: Feb. 5, 2013

(65) Prior Publication Data
US 2013/0223941 A1 Aug. 29, 2013

Related U.S. Application Data

(63) Continuation of application No. PCT/DE2011/001555, filed on Aug. 5, 2011.

(30) Foreign Application Priority Data

Aug. 5, 2010 (DE) .......................... 10 2010 036 874

(51) Int. Cl.
  *B23C 5/10* (2006.01)
  *B23C 5/18* (2006.01)
  (Continued)

(52) U.S. Cl.
  CPC ................ *B23C 5/18* (2013.01); *Y10T 407/26* (2015.01); *Y10T 29/4998* (2015.01); *Y10T 407/14* (2015.01); *Y10T 407/1948* (2015.01); *Y10T 407/1904* (2015.01); *B23B 27/18* (2013.01); *B23B 2205/12* (2013.01);
  (Continued)

(58) Field of Classification Search
  USPC ............. 407/118, 119, 32, 53, 54, 40, 47, 51, 407/56; 76/115, 108.1, 108.6
  See application file for complete search history.

(56) References Cited

U.S. PATENT DOCUMENTS 2,678,487 A * 5/1954 Onsrud ........................... 407/36
3,514,828 A * 6/1970 Wale .............................. 407/54
(Continued)

FOREIGN PATENT DOCUMENTS

DE       1552450 A1 *   1/1970
DE       196 35 889       3/1998
(Continued)

OTHER PUBLICATIONS

Machine Translation of the description section of foreign reference DE 1552450 A1. The machine translation is on the corresponding document FR 1552800 of foreign reference DE 1552450 A1.*
(Continued)

*Primary Examiner* — Daniel Howell
*Assistant Examiner* — Nicole N Ramos
(74) *Attorney, Agent, or Firm* — Burr & Brown, PLLC

(57) ABSTRACT

A machining tool comprising at least one plate-shaped cutting insert made of impact- and/or wear-resistant cutting material at least in some sections and which is adhesively bonded to a cutter holder directly by means of an adhesive layer in an immovable manner by means of a contact surface arrangement, the cutting insert substantially prism-shaped. A base area of the prism is adhesively bonded to the cutting insert holder substantially over the full area, a jacket surface arrangement of the prism adjacent to the cutting edge for spatially fixing the cutter is drawn to the tool, and a section of the jacket surface arrangement substantially opposite the cutting edge is caught in a fitting groove of the cutting insert holder.

23 Claims, 4 Drawing Sheets

(51) Int. Cl.
*B23B 27/18* (2006.01)
*B23D 77/02* (2006.01)
*B23G 5/00* (2006.01)
*B23C 5/28* (2006.01)
*B23P 15/34* (2006.01)

(52) U.S. Cl.
CPC .... *B23B 2226/125* (2013.01); *B23B 2226/275* (2013.01); *B23B 2226/315* (2013.01); *B23B 2240/21* (2013.01); *B23B 2250/16* (2013.01); *B23C 2210/168* (2013.01); *B23C 2226/125* (2013.01); *B23C 2226/27* (2013.01); *B23C 2226/315* (2013.01); *B23C 2240/21* (2013.01); *B23C 2250/16* (2013.01); *B23D 77/02* (2013.01); *B23D 2277/10* (2013.01); *B23G 5/00* (2013.01); *B23C 5/28* (2013.01); *B23P 15/34* (2013.01)

(56) References Cited

U.S. PATENT DOCUMENTS

| | | | | |
|---|---|---|---|---|
| 4,023,246 | A * | 5/1977 | Haug et al. | 407/56 |
| 4,437,800 | A * | 3/1984 | Araki et al. | 407/119 |
| 4,983,078 | A * | 1/1991 | Unozawa | 407/34 |
| 5,120,327 | A * | 6/1992 | Dennis | 51/293 |
| 5,152,640 | A * | 10/1992 | Regis et al. | 407/32 |
| 5,193,944 | A * | 3/1993 | Nishimura | 407/53 |
| 5,232,316 | A * | 8/1993 | Tennutti | 407/23 |
| 5,272,940 | A * | 12/1993 | Diskin | 76/108.6 |
| 5,326,195 | A * | 7/1994 | Brox | 407/32 |
| 5,486,072 | A * | 1/1996 | Green | 407/32 |
| 5,711,492 | A * | 1/1998 | Cheladze | 241/220 |
| 5,853,268 | A * | 12/1998 | Simpson | 407/119 |
| 5,865,571 | A | 2/1999 | Tankala et al. | |
| 6,076,999 | A | 6/2000 | Hedberg et al. | |
| 7,290,965 | B2 * | 11/2007 | Gaiser et al. | 409/132 |
| 7,367,753 | B2 * | 5/2008 | Maurer | 407/53 |
| 8,052,765 | B2 * | 11/2011 | Cho et al. | 51/293 |
| 2003/0113174 | A1 * | 6/2003 | Fiorello | 407/113 |
| 2005/0220546 | A1 * | 10/2005 | Yamagata et al. | 407/119 |
| 2007/0084315 | A1 | 4/2007 | Trice et al. | |
| 2009/0047082 | A1 | 2/2009 | Kay | |

FOREIGN PATENT DOCUMENTS

| | | |
|---|---|---|
| DE | 299 01 414 | 8/1999 |
| DE | 199 03 276 | 8/2000 |
| DE | 103 16 584 | 10/2004 |
| DE | 103 59 854 | 7/2005 |
| DE | 20 2005 000 9 | 6/2006 |
| DE | 202005000994 U1 * | 7/2006 |
| DE | 10 2005 034 422 | 1/2007 |
| EP | 0 054 510 | 6/1982 |
| EP | 473177 A1 * | 3/1992 |
| FR | 2811924 A1 * | 1/2002 |
| JP | 57102723 A * | 6/1982 |
| JP | 61038804 A * | 2/1986 |
| JP | 63278706 A * | 11/1988 |
| JP | 05329707 A * | 12/1993 |
| JP | 07096413 A * | 4/1995 |
| JP | 2001030107 A * | 2/2001 |
| JP | 2005177898 A * | 7/2005 |
| JP | 2006159344 A * | 6/2006 |
| JP | 2006159349 A * | 6/2006 |
| RU | 2060114 C1 * | 5/1996 |
| WO | 98/01250 | 1/1998 |
| WO | 98/57771 | 12/1998 |
| WO | 00/44518 | 8/2000 |
| WO | 2009/023244 | 2/2009 |

OTHER PUBLICATIONS

Machine Translation of the description section of foreign reference DE 1552450 A1. The machine translation is on the corresponding document FR 1552800 of foreign reference DE 1552450 A1. Sep. 11, 2013.*

International Search Report and Written Opinion of the International Searching Authority (with English Translation) dated May 7, 2012, 19 pages.

* cited by examiner

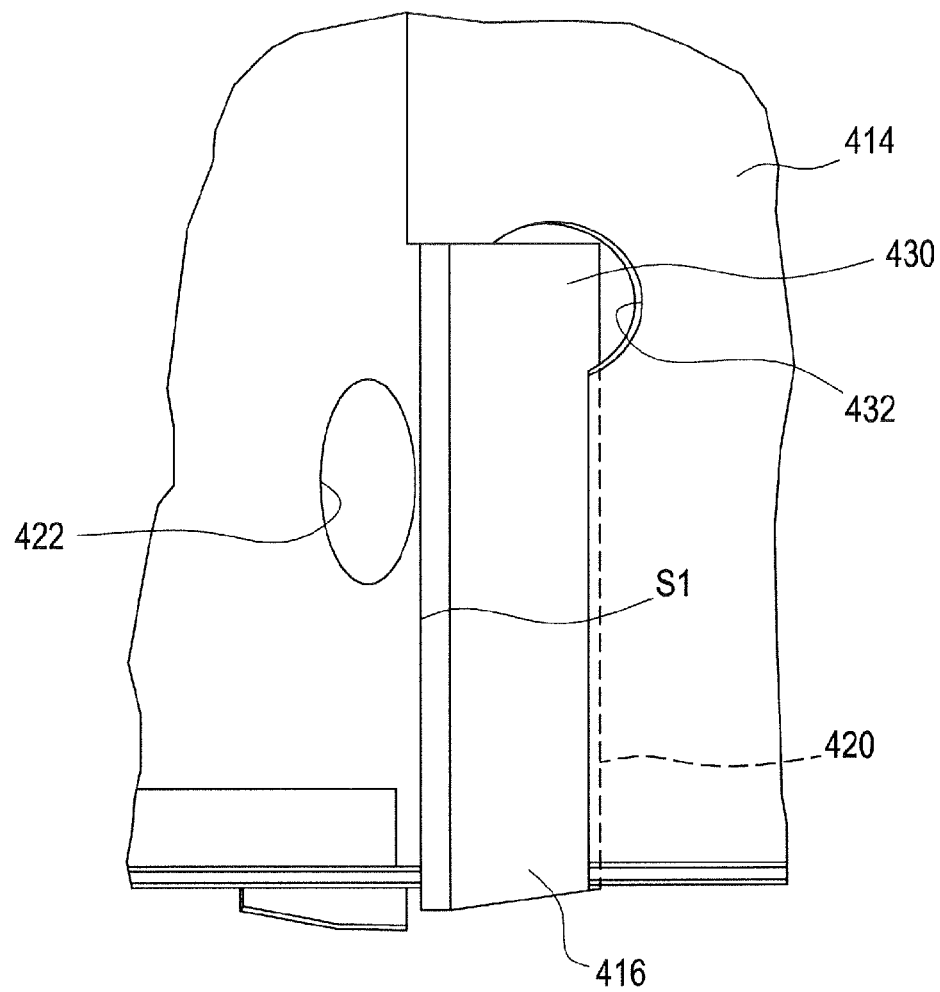

MACHINING TOOL AND METHOD FOR PRODUCING SAME

FIELD OF THE INVENTION

The invention relates to a machining tool, e.g., a turning, drilling, milling or frictional tool, with at least one plate-shaped cutting insert, which at least in sections consists of an impact and/or wear-resistant cutting material, e.g., polycrystalline diamond (PKD), cubic boron nitride (CBN), CVD diamond or a cermet material, and is immovably adhesively bonded by means of a contact surface arrangement with a cutter holder directly via an adhesive layer, according to the preamble of claim 1, as well as to a method for manufacturing such a tool.

BACKGROUND OF THE INVENTION

Such plate- or lamina-shaped cutting inserts are conventionally used where it is important to work at high cutting speeds, while still realizing good service lives and/or achieving a particularly good surface quality and dimensional accuracy.

These cutting inserts are conventionally fixed on a cutter holder via a contact surface arrangement, which is preferably designed in such a way as to allow a dimensionally accurate alignment of the cutting insert relative to the cutter holder during the final fixation process. In order to permit this dimensionally accurate alignment and keep the load placed on the cutting inserts, which often only have a laminar thickness of 1 to 2 mm, within manageable limits, cutting inserts like these have previously been soldered with the cutter holder.

To the extent that adhesively bonding cutter inserts had already been envisaged earlier (e.g., see DE 199 03 276 A1 or DE 299 01 414 U1), the cutting insert comprised of hard cutting materials had to be secured to a separate support plate, and then be joined with the cutter holder as a composite panel, which leads to an increased production outlay and problems in terms of dimensionally accurate alignment. In addition, the thickness of the cutting insert had to be enlarged as a result, thereby greatly limiting the area of application for the cutting inserts.

SUMMARY OF THE INVENTION

In order to fabricate a cutting tool for a wide variety of applications with any cutting insert geometry and size desired not just more easily, but also with a greater dimensional stability, without detracting from the service life of the tool, DE 20 2005 000 994 U1 discloses a generic tool in which the cutting insert is adhesively bonded directly with the contact surface arrangement. Since the procedural step of soldering is eliminated, the cutting insert can be positioned on the cutter holder or tool with less effort and good accuracy. This is because the cutting insert no longer has to be positioned while maintaining a predetermined soldering gap. The positioning accuracy of the cutting insert is further enhanced by virtue of the fact that the adhesive bonding process can take place at temperatures considerably below the previously required soldering temperature, even when using a thermal adhesive film. As a result, the danger of thermally induced dimensional warping and/or so-called "frozen" stresses is eliminated. Even with regard to the shape and position of contact surfaces to be used for connection purposes, the tool according to the invention provides more leeway, since the flow pattern of the soldering material is no longer important.

The tools with adhesively bonded inserts known from Document DE 20 2005 000 994 U1 have been shown to work with enough process safety first and foremost when very thin and large cutting insert laminas are directly and flatly adhesively bonded with the cutter holder. However, as soon as there is a larger distance between the cutter and contact surface, e.g., when thicker cutting inserts have to be used, for example in milling tools, or if the cutters, e.g., in reamers or drill finishing tools, have a considerably axial extension, it is difficult to keep the service life at a sufficiently high level. This limits the area of application.

Therefore, the object of the invention is to further develop a generic tool in such a way as to expand its area of application, while at the same time making it more economical to manufacture.

This object is achieved by the features in claim 1. A particularly economical manufacturing process for the tool according to the invention is the subject of claim 17.

According to the invention, the primary supporting and fixation functions are still handled as before by a base surface of the prism in conjunction with a flat contact surface of the cutting insert holder ( ) via adhesive bonding over essentially the entire surface. At the same time, however, a jacket surface arrangement of the prism adjacent to the cutting edge or primary cutting edge is used to spatially fix the position of the cutter in the space, i.e., in relation to the tool holder, i.e., by way of defined locating points. What makes this possible is that the cutting insert can be smoothly adjusted on the contact surface, with the adhesive interspersed. During this adjustment, a section of the jacket surface arrangement situated essentially opposite the cutting edge slides into a fitting groove of the cutting insert holder, in which the cutting insert is finally fixed in place, i.e., held without play. A tilting moment caused by the cutting force acting on the primary cutter can be effectively countered in this way. This relieves the adhesive bond, especially since the cutting force represents an impact force, i.e., an expansive force, which acts on the cutter with a high frequency. The fitting groove thus acts as a clamping location, with which the fatigue strength of the joint between the cutting insert and cutting insert holder can be significantly raised. As a result, the geometry of the cutting insert is no longer limited to flat cutting plates. At the same time, there is the special advantage that the thickness of the adhesive layer can easily be kept so thin without losing adhesion as to spatially fix the position of the primary cutter in the prescribed tolerance range without having to finish it.

It has further been shown that the adhesive layer has a cushioning effect even if its thickness is kept within a range measuring on the order of the positional tolerance for the cutter, i.e., within the $\frac{1}{100}^{th}$ mm range, thereby effectively smoothening force spikes that arise on the cutter and in the fitting groove. This yields not just a smoother operation and reduced vibrating tendency for the tool, but also improves the service life of the tool.

Another special advantage to the tool according to the invention is that the cutting insert still has the design of reversible insert, thereby doubling its service life in use. This is because the adhesive layer is much easier to remove from the already used cutting insert than a soldering material while retaining the shape, so that the cutting insert can again be fixed to the cutter holder with an unchanged positional accuracy after reversed.

Advantageous further developments are the subject of the subclaims.

Since the invention improves the introduction of force from the cutter into the cutting insert, the cutting material can be selected from an expanded range of materials. In addition to polycrystalline diamond (PKD), cubic boron nitride (CBN), CVD diamond or a cermet material, even a fiber-reinforced plastic can be drawn upon as the cutting material. In this case, the cutting tool can have a cutting part and a base body holding the cutting part with cutting inserts. The cutting part and base body can be connected with each other as a single piece, meaning that the cutting tool can consist of a single piece comprised of a cutting part and base body that were initially separately fabricated, or as an alternative be made out of a single piece using a solid material. However, the cutting part and base body can also be detachably joined together, i.e., the cutting tool can exhibit a modular design. It has been shown that the adhesive bonding technique in conjunction with the fitting groove yields even better results in terms of cutter positioning and fatigue strength of the joint if the cutting insert holder consists of fiber-reinforced plastic, at least in the area of the surfaces involved in adhesive bonding and fixation.

Both the cutting body and base body can each be designed as a single piece. However, the cutting part can also exhibit a plurality of cutting bodies, e.g., cutting plates or cutting bars, which are arranged on a holding body joined with the base body, e.g., on a cartridge that holds the cutting plate. The base body, which holds the cutting part or aforementioned holding body, and is clamped via the cutting tool into a tool holder, for example, can also be designed as a single piece or multiple pieces.

The smooth operation and service life can be increased even further by having the cutting insert holder and/or a cutting insert layer forming the cutter be made at least partially, preferably completely, out of a fiber-reinforced plastic according to claim 9. One advantage has to do with the fact that the cutting insert fabricated out of a wide variety of materials, including CFK or CFC material, can be inserted into the fitting groove applying a certain elastic deformation, and thus be clamped in an even more fixed and precisely positioned manner. Another advantage lies in the fact that the cutting insert holder exerts an additional vibration damping effect, which has a favorable impact on the forces acting on the cutting insert and its joint.

In the further development of claim 9, the cutting tool itself is made at least partially out of a fiber-reinforced plastic. In this conjunction, what this means at least in part is that it is fabricated as a single piece out of a body comprised of fiber-reinforced plastic, e.g., an extruded (pultruded) round bar, or that one or more selected functional sections are made out of fiber-reinforced plastic. Such functional sections are sections whose function is to transmit forces and/or torques that arise while cutting between the cutting part and base body. As a consequence, such functional sections can be the base body and/or cutting part. Apart from that, however, these functional sections also encompass functionally or structurally definable constituents of the base body and/or cutting part, for example a shank section on the side of the base body, or the aforementioned holder body, e.g., cartridge, or the aforementioned cutting body on the side of the cutting part.

Using a fiber-reinforced plastic, for which in particular CFK (carbon fiber-reinforced plastic) or CFC (carbon fiber-reinforced carbon) are suitable, enables the manufacture of a cutting tool characterized by a lower weight in comparison to conventional cutting tools based on metal or ceramic. At the same time, using a fiber-reinforced plastic that takes into account special requirements placed on the respective functional section and a corresponding processing, in particular with respect to fiber density and fiber orientation, makes it possible to achieve the required characteristics with regard to stiffness, impact strength and vibration and noise damping.

Preferred fiber-reinforced plastics at least for a cutting tool composed of a single piece include extruded CFK round bars with short fibers embedded into a plastic matrix, which are essentially unidirectionally aligned in the longitudinal direction of the cutting tool. In addition to the aforementioned characteristics, such fiber-reinforced plastics are easier to process than the conventionally used materials based on metal or ceramic.

The cutting insert holder according to the invention (given a single-piece design) or at least one functional section of the cutting insert holder (given a multiple-piece design) can be fabricated based on a tool blank made out of a fiber-reinforced plastic. In a single-piece cutting insert holder of the cutting tool, the fitting groove required for accommodating the cutting insert can be introduced, e.g., milled, into the tool blank in the area of the cutting part, complete with mating surfaces for the base surface and the jacket surface arrangement of the cutting insert, while the tool blank is machined for accommodation and clamping in a tool holder in the area of a tool base body. In a multiple-part cutting tool, the tool blank is only correspondingly machined in terms of the functions intended for the respective functional section.

The cutting insert holder can be a cylindrically wound laminate, i.e., the cutting insert holder can be comprised of several woven fabrics embedded into a synthetic resin matrix, for example which are wound around a core of solid resin material or a hollow core. However, the cutting insert holder can also be an injection molded, transfer molded or pultruded part. Cutting insert holders manufactured according to one of the aforementioned methods, in particular through pultruding, are characterized by short fibers embedded in a matrix consisting of synthetic resin, and therefore offer the advantage relative to laminates, which most often only contain long fibers, of being able to precisely generate clearly delineated surfaces, for example a driving area, and defined edges, for example primary and secondary cutting edges, even given small diameters.

Of course, the fiber-reinforced plastic material used for tool manufacture is correspondingly selected based on the respectively expected requirements, e.g., with respect to strength and stiffness. For this reason, CFK and CFC materials are preferably used for the cutting tools fabricated as a single piece.

The cutting part can encompass one or more cutting bodies. Therefore, the cutting part can be designed as a single piece or encompass several cutting bodies, e.g., in the form of cutting plates or cutting bars. In each instance, different materials with varying characteristics in terms of hardness, vibration damping, weight, temperature resistance, etc. can be expediently and advantageously combined with each other in this structural design. For example, the cutting part or cutting bodies can be made out of a steel material, carbide or a ceramic composite. The cutting bodies can be arranged on the base body or a holding body joined with the base body, for example adhesively bonded. For example, the holding body can be a cartridge, on which a cutting body, e.g., a cutting plate, is attached, for example in an adjustable manner. The base body and/or holding body can be made out of a fiber-reinforced plastic. The cutting bodies can be easily and reliably adhesively bonded to a material comprised of fiber-reinforced plastic. Alternatively, the cutting bodies can also be screwed to the base body or holding body, or held in place on them by clamping claws.

Using a fiber-reinforced plastic for at least one of the functional sections of a cutting tool permits the provision of an internal coolant and/or lubricant supply channel system. In particular, having this coolant and/or lubricant supply channel system pass through the functional section consisting of the fiber-reinforced plastic enormously simplifies the formation by comparison to conventional steel or ceramic materials.

If at least sections of the fitting grove are used for adhesive bonding ( ) according to claim 3, the retention force and service life of the tool can be elevated, while at the same time further diminishing the running noise.

The adhesive layer can take a wide variety of forms. If it consists of an adhesive layer or adhesive imprint, a low installation engineering outlay is enough to realize extremely thin adhesive layers, which lie on the order of the production and positional tolerance of the tool cutters, so that the tool must no longer be supplied to finishing operations after the cutting inserts have been introduced.

The cutting insert can also have a layered structure, wherein the cutting material layer comprises only a fraction of the overall thickness of the cutting insert. According to claim 6, the cutting insert has a structure in which the thickness (DS) of a cutting material layer corresponds to between 20 and 70%, preferably between 45 and 55%, of the overall thickness (DE) of the cutting insert (16). This yields more options in selecting the adhesive bond between the component that holds the cutting material layer and the cutting insert holder.

Having the cutting insert holder be fabricated as a single piece yields a greater stability for the tool.

The tool can also be comprised of multiple parts in the area of the cutting insert holder, wherein at least one base body holding the cutting insert holder is made out of a fiber-reinforced plastic.

In this case, it is advantageous for the cutting insert holder to be non-positively and/or positively connected with the base body or a holding body arranged between the base body and the cutting insert holder.

An internal coolant and/or lubricant supply channel system according to claim 13 can be used to attain an extreme improvement in the service life of the tool cutters, in particular if the coolant/lubricant supply is drawn upon to transport away the chips.

If a fiber-reinforced plastic is used in the area of the cutters or cutting insert holder, it is advantageous for the latter to encompass carbon fiber-reinforced plastic (CFK) and carbon fiber-reinforced carbon (CFC).

If according to claim 15 the adhesive layer has a thickness lying within the tolerance range for the dimensional accuracy of the tool cutter, e.g., between 5 and 100 μm, the cutting insert can then be joined with the cutting insert holder in such a way that the cutters need not be subsequently machined to their final dimensions.

If according to claim 16 the fitting groove and/or at least a contact surface of the cutting insert holder that fixes the cutting insert in position has at least one pocket, a quantity of adhesive that proves excessive during the assembly process can be smoothly accommodated therein, so that positional displacements of the cutter owing to assembly can be minimized.

The structural design of the tool as described above makes it possible to realize the following manufacturing process, which is distinguished by an especially high precision and good economic efficiency.

A plate-shaped cutting insert machined to its final dimensions, which at least in sections consists of impact and/or wear-resistant cutting material, and essentially has the shape of a prism, is first placed with the base surface of its prism onto a contact surface of the cutting insert holder with an adhesive layer interspersed. The cutting insert on this contact surface can now be pushed into a fitting groove of the cutting insert holder lying essentially opposite the cutting edge or primary cutting edge until a jacket surface arrangement of the prism adjacent to the cutting edge stops against corresponding mating surfaces of the cutting insert holder for spatially fixing the cutter, i.e., with predetermined abutment points for precisely and reproducibly localizing the cutter. The process of curing the adhesive is then performed while maintaining the position-fixing stop.

BRIEF DESCRIPTION OF THE DRAWINGS

Several exemplary embodiments of the invention will be described in greater detail below based on schematic drawings. Shown on:

FIG. 5 is a schematic, sectional side view of another embodiment of the invention.

DETAILED DESCRIPTION OF THE INVENTION

Figure 1:
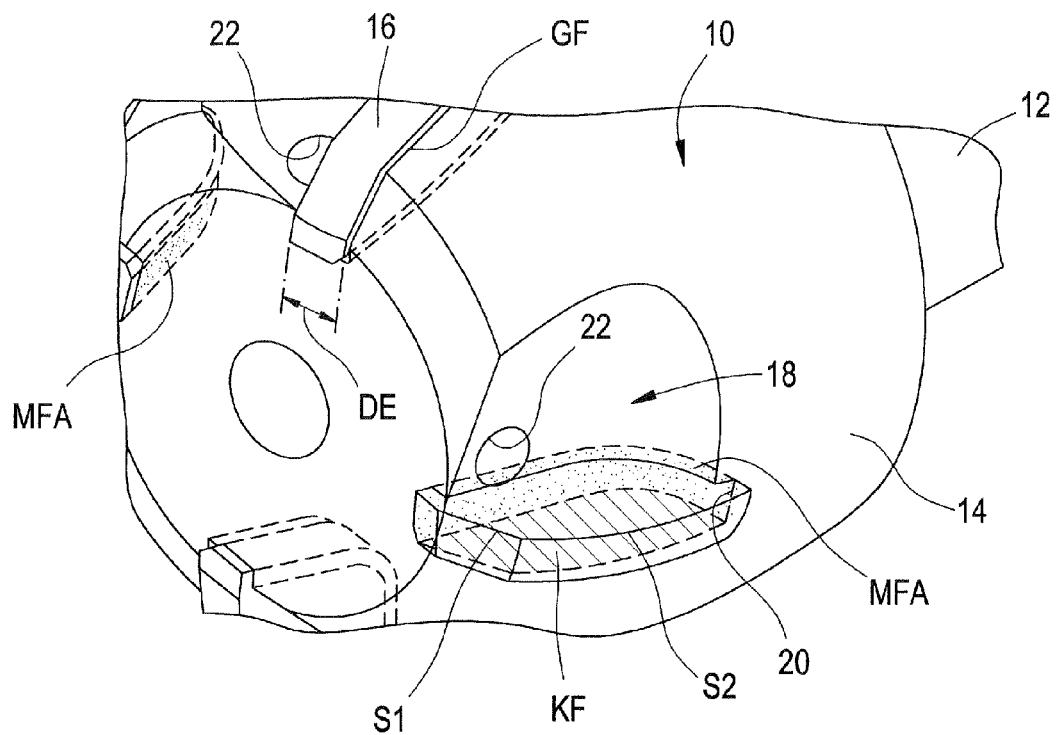
FIG. 1 is a schematic, perspective view depicting a section of the face of a rotary drivable cutting tool according to the invention, configured as a four-edged countersinking tool.

Marked with reference number 10 on FIG. 1 is a rotary driven cutting tool configured as a countersinking tool, whose shank 12 has a cutting part 14. The cutting part 14 is essentially cylindrical in design, and machined in such a way that it can hold a plurality of plate- or lamina-shaped cutting inserts 16 in an accurately positioned manner. Pockets 18 for the cutting inserts 16 are formed in the cutting part 14, which is also referred to as the cutting insert holder below.

The cutting inserts 16 in their entirety, or at least in the layer that forms the cutters S1, S2, consist of impact and/or highly wear resistant cutting material, e.g., polycrystalline diamond (PKD), cubic boron nitride (CBN), CVD diamond or a cermet material. However, the cutting material can also be selected from the group of CFK or CFC materials.

Accurate positioning must take place for each cutting insert 16 in such a way as to ensure the effective outer diameter as well as the location and alignment of the primary cutters S1 and S2 within a narrow tolerance range. To this end, the following arrangement was decided upon:

The cutting insert 16 has a shape that essentially resembles or follows a prism, i.e., it has two plane-parallel surfaces and a jacket surface lying in between, which consists of essentially parallel generatrixes. The cutting insert 16 is secured to the cutter or cutting insert holder 14 in such a way as to adhesively bond at least one base surface GE of the prism with the cutting edge holder 14 over essentially the entire surface on the surface KF depicted with hatched lines on FIG. 1. A jacket surface arrangement MFA of the prism adjacent to the cutting edge S2, denoted with a dot matrix on FIG. 1, is drawn to the tool 10 for spatially fixing the cutters S1 and S2. In other words, mating surfaces for the jacket surface arrangement MFA are formed on the cutting insert holder 14, fabricated and adjusted to the shape of the cutting insert 16 in such a way that the cutting insert 16 can only be fixed to the cutting insert in a very specific stop position, wherein the spatial alignment of the cutters S1 and S2 is clearly established in this position.

In addition, a section of the jacket surface arrangement lying essentially opposite the cutting edges S1 and S2 is caught in a fitting groove 20 of the cutting insert holder 14, either without play or having the least possible clearance fit. In the exemplary embodiment shown, the fitting groove 20 traces a curve, since the cutters S1 and S2 also run in two divergent directions.

Reference number 22 denotes the opening of a channel of an interior coolant/lubricant supply system.

An especially high positioning accuracy can be achieved if the adhesive layer is dimensionally stable and has a precisely established thickness. For example, this can be accomplished by using an adhesive layer or an adhesive imprint, whose thickness preferably lies within the tolerance range for the dimensional accuracy of the tool cutter, e.g., ranges between 5 and 100 μm.

The special advantage to this arrangement lies in the fact that a defined abutment of the cutting insert 16 against the cutter holder 14 can be used to establish the three-dimensional, immovable connection between the cutting insert 16 and cutter holder 14, which basically improves the manufacturing accuracy and economic efficiency of the manufacturing process for the tool. Because no process temperatures approaching the melting point of a solder are required to fabricate the adhesive bond, even when using a so-called thermal adhesive, thermally induced tensions and positional inaccuracies (caused by differing temperatures of the cutting insert and cutter holder during final assembly) are averted from the very outset. Since it can further be ensured with a higher level of certainty in an adhesive bond that the entire contact surface will participate in the joining process, the cutting insert is also supported reliably enough even at very high cutting forces, and thus safeguarded against excessive stresses.

According to the invention, the primary supporting and fixation functions are still handled as before by a base surface of the prism, specifically in the area of the surface KB via adhesive bonding over essentially the entire surface. At the same time, however, a jacket surface arrangement of the prism adjacent to the cutting edge or primary cutting edge is used to spatially fix the position of the cutter in the space, i.e., in relation to the tool holder, in a clear manner, i.e., by way of defined locating points. What makes this possible is that the cutting insert 16 can be smoothly adjusted on the contact surface KB with the adhesive interspersed until reaching a statically defined stop position. During this adjustment, a section of the jacket surface arrangement situated essentially opposite the cutting edge S1, S2 slides into the fitting groove 20 of the cutting insert holder 14, in which the cutting insert is finally fixed in place, i.e., held without play. A tilting moment caused by the cutting force acting on the primary cutter can be effectively countered in this way. This relieves the adhesive bond. The fitting groove 20 thus acts as a clamping location, with which the fatigue strength of the joint between the cutting insert and cutting insert holder can be significantly raised.

In the embodiment according to FIG. 1, adhesive bonding takes place exclusively via the surface KF. However, the jacket surface arrangement MFA can also be used in addition to the adhesive bond, wherein it is advantageous in this case for the area of the abutting mating surfaces in the cutting insert holder, i.e., the area of the fitting groove 20, to incorporate at least one pocket, which can accommodate excess adhesive that is displaced during assembly, so that the cutting insert always makes it to the provided stop position.

It has further been shown that the adhesive layer has a cushioning effect even if its thickness is kept within a range measuring on the order of the positional tolerance for the cutter, i.e., within the $1/100^{th}$ mm range, thereby effectively smoothening force spikes that arise on the cutter and in the fitting groove. This yields not just a smoother operation and reduced vibrating tendency for the tool, but also improves the service life of the tool.

The joining technique according to the invention even makes it possible to fabricate the cutting insert out of CFK or CFC material, in particular in cases when at least sections of the cutting insert holder 14 also consist of such a material. Using this material for the cutting insert holder not only dampens vibrations, but also smoothes out the force spikes acting on the cutting insert at the primary cutters S1 and S2, so that even more brittle materials can find application for the cutting inserts.

For example, the adhesive for manufacturing the adhesive bond can be comprised of an acrylate adhesive based on dimethacrylate ester, such as LOCTITE 2701. This adhesive is a brand carried by Henkel AG & Co. KGaA. Details concerning the material properties may be gleaned from the June 2004 technical data sheet, which can be downloaded at http://65.213.72.112/tds5/docs/2701-DE.PDF.

The advantage to this adhesive is that it cures rapidly, and has a high strength and temperature resistance. At the same time, this adhesive can be softened at temperatures in excess of 200° C., making it possible to again detach the joint between the cutting insert 16 and cutting insert holder when needed, without any risk of damage.

Before fabricating the joint, the joining surfaces are advantageously cleansed with a cleaning agent formulated based on acetone. For example, this can be LOCTITE 7061 (brand of Henkel AG & Co. KG aA). Details may be gleaned from the July 2008 technical data sheet for LOCTITE 7061, e.g., downloadable at the web address http://65.213.72.112/tds5/docs/7061-DE.PDF.

Depending on the highly wear-resistant cutting material used, the cutting insert can exhibit a varying design. The structure is preferably selected in such a way that the thickness of a cutting material layer DS measures between 45 and 55% of the overall thickness DE of the cutting insert 16. In other words, for example, the cutting material layer lies on an equally thick substrate, e.g., made out of carbide, to which the cutting material layer, for example a polycrystalline diamond layer or a CBN layer, is bonded during a sintering process.

FIGS. 2 to 5 show further configurations of the invention. To simplify the description, those components corresponding to the constituents in the embodiment described above are provided with similar reference numbers, but preceded by a "1", "2", "3" or "4".

Figure 2:
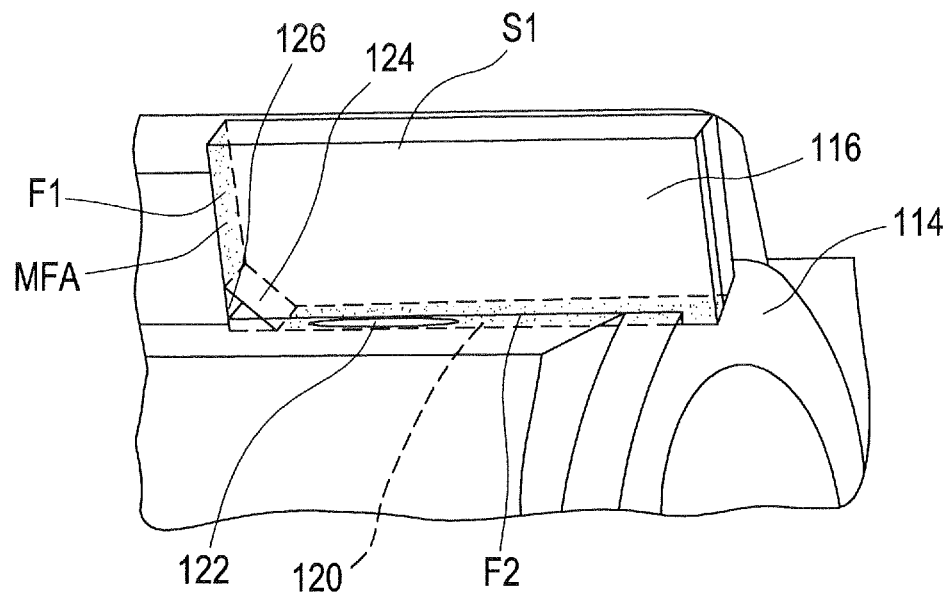
FIG. 2 is a schematic, perspective view depicting a section of the face of another rotary drivable cutting tool according to the invention, configured as a reamer.

FIG. 2 provides a sectional view of a reamer, the cutting insert 116 of which has an axially aligned cutting edge S1. It is thus also sufficient for the cutting insert holder 114 to have a linear fitting groove 120, in which a linear section of the jacket surface arrangement lying opposite the cutting edge S1 is accurately positioned and held. The position of the cutter S1 is fixed in all three coordinates by means of the fitting groove 120 and a jacket surface arrangement MFA situated at an angle thereto, which is adjacent to the cutting edge S1. In order to avoid restraints during assembly, the cutting insert 116 has a chamfer 124 between the jacket surfaces F1 and F2, thereby leaving a free space 126 in the interior corner region of the fitting groove 120 with the cutting insert in the assembled state.

Figure 3:
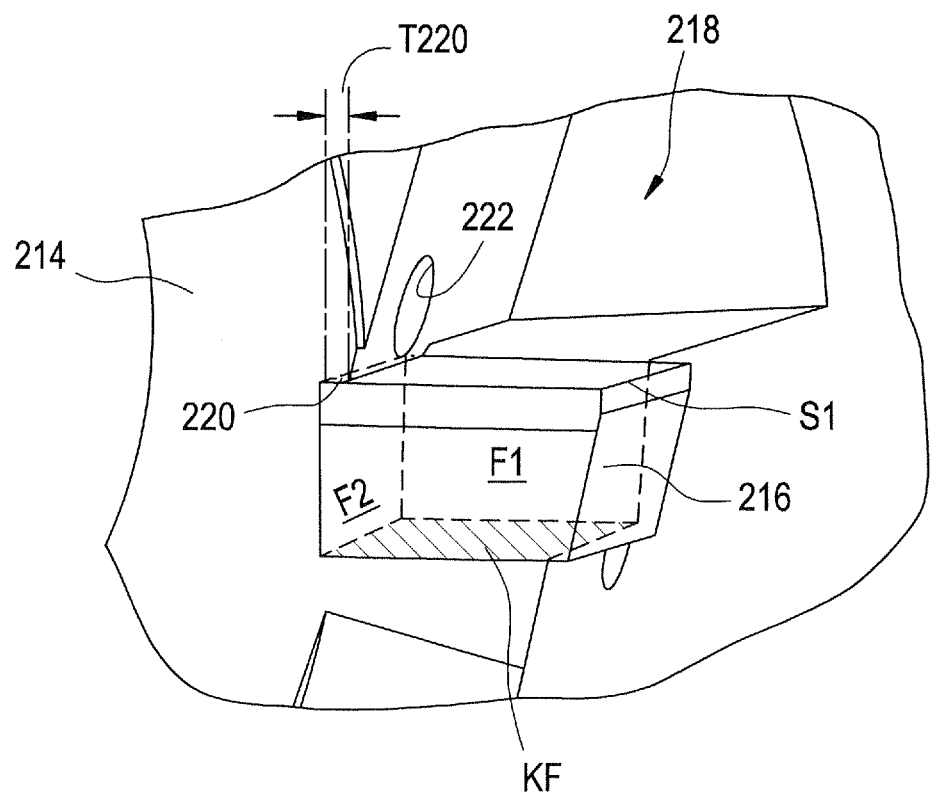
FIGS. 3 and 4 are schematic, perspective views depicting a section of the face of other rotary drivable cutting tools according to the invention, respectively configured as a milling tool.

FIG. 3 presents the realization of the invention based on the example of a milling tool. The cutting edge S1 is positioned via surfaces F1 and F2, wherein the surface F2 comes to lie in the fitting groove 220, which has a comparatively shallow depth T220.

Figure 4:
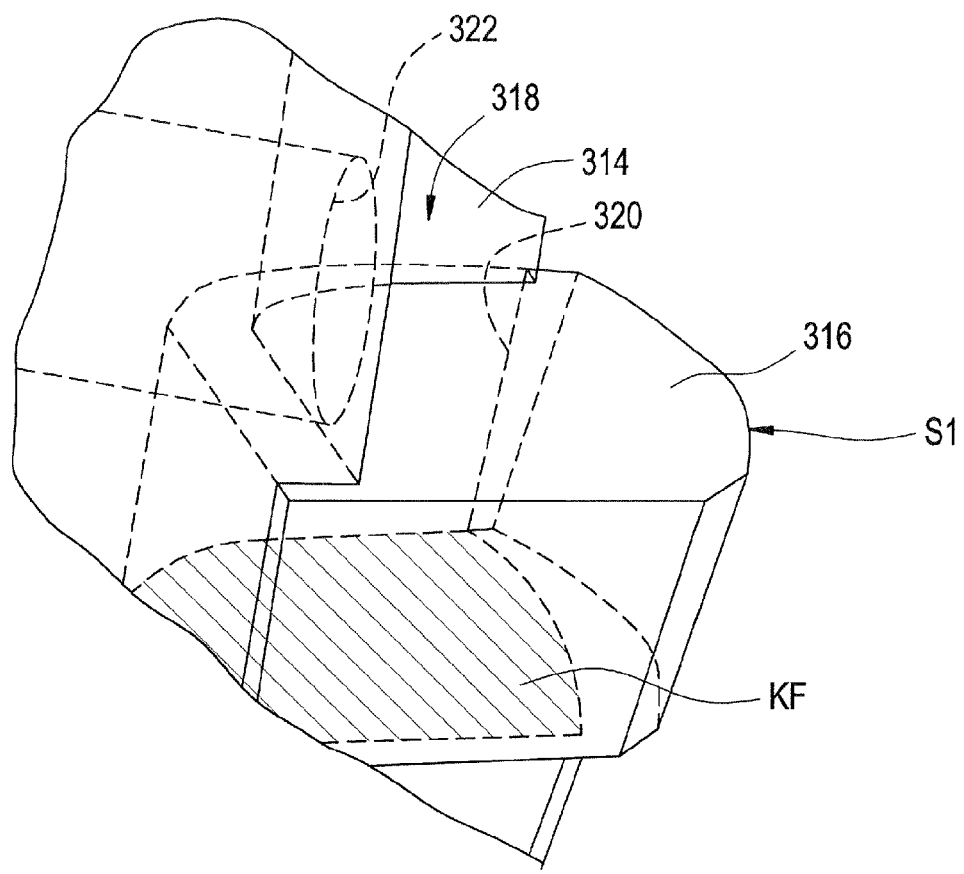

The constellation depicted on FIG. 4 is similar, but the cutter S1 of the milling cutting insert 316 exhibits a more complex design. Accordingly, the fitting groove 320 is also shaped to trace a curve in such a way that allows it to counter the cutting forces arising on the cutter S1 with a countertorque, thereby limiting the normal forces in the area of the adhesive surface KF. This fitting groove configuration is similar to the one on FIG. 1.

Finally, FIG. 5 shows an embodiment similar to the one on FIG. 2, with the peculiarity that a relief cut 432 is provided in the cutting insert holder for the interior corner 430 of the cutting insert 416.

Of course, the described embodiments can be modified without departing from the main idea of the invention. For example, the adhesive layer can be applied in any way desired. However, in order to facilitate an exact positioning of the cutter in the final assembly location, it is advantageous to use an adhesive film or adhesive imprint.

The tool can also be a non-rotary drivable tool. After adhesive bonding is complete, the cutting insert can also be subjected to a finishing operation.

The fixed clamping in the fitting groove can also be realized or improved using a thicker adhesive layer.

A wide variety of structures can be drawn upon for the cutting insert, depending on which hard cutting material or which fiber-reinforced plastic is used. If the thickness of the cutting material layer measures between 20 and 70%, preferably between 45 and 55%, of the overall thickness of the cutting insert, the lamina is additionally stabilized, thereby expanding its potential area of application.

The joining surfaces can also undergo a surface treatment as required, if doing so makes it possible to improve adhesion via the adhesive layer.

As a consequence, the invention provides a machining tool with at least one plate-shaped cutting insert, which at least in sections consists of an impact and/or wear-resistant cutting material, and is immovably adhesively bonded by means of a contact surface arrangement with a cutter holder directly via an adhesive layer, wherein the cutting insert essentially has the shape of a prism. The cutting insert is secured to the cutting holder in such a way that a base surface of the prism is adhesively bonded with the cutting insert holder over essentially its entire surface, a jacket surface arrangement of the prism adjacent to the cutting edge is drawn to the tool for spatially fixing the cutter, and a section of the jacket surface arrangement lying essentially opposite the cutting edge is caught in the fitting groove of the cutting insert holder. When assembling the cutting insert, the process preferably involves placing the base surface of the prism of the plate-shaped cutting insert machined to its final dimensions onto a contact surface of the cutting insert holder with an adhesive layer interspersed, and on this contact surface pushing it into a fitting groove of the cutting insert holder lying essentially opposite the cutting edge until a jacket surface arrangement of the prism adjacent to the cutting edge stops against corresponding mating surfaces of the cutting insert holder for spatially fixing the cutter. The process of curing the adhesive is then performed while maintaining the position-fixing stop.

The invention claimed is:

1. A machining tool comprising:
at least one plate-shaped cutting insert, which at least in sections comprises an impact and/or wear-resistant cutting material; and
a cutting insert holder,
the cutting insert holder having a cutting end, a shank end opposite the cutting end, an outer surface, an axis, and a fitting groove, the fitting groove having at least a first surface, a second surface, and a third surface, the first surface and the second surface spaced from each other, the third surface bounded by a first edge, a second edge, a third edge and a fourth edge, the first edge of the third surface extending along an edge of the first surface, the second edge of the third surface extending along an edge of the second surface, the third edge of the third surface toward the cutting end relative to the fourth edge of the third surface, the fourth edge of the third surface toward the shank end relative to the third edge of the third surface, a first portion of the third surface extending in a first direction through only a portion of the cutting insert holder toward the shank end of the cutting insert holder, a second portion of the third surface diverging from the first direction and extending in a second direction to the outer surface of the cutting insert holder,
the cutting insert comprising a base surface and a cutting edge,
the cutting insert bonded by a contact surface arrangement with the cutting insert holder directly via an adhesive layer,
the cutting insert essentially having the shape of a prism,
the cutting insert secured to the cutting insert holder in such a way that:
a) a base surface of the prism is adhesively bonded with the cutting insert holder over essentially an entire surface of the base surface;
b) a jacket surface arrangement of the prism adjacent to the cutting edge is drawn to the cutting insert holder for spatially fixing the cutting edge; and
c) a section of the jacket surface arrangement is caught in the fitting groove of the cutting insert holder.

2. The tool according to claim 1, wherein the cutting material comprises polycrystalline diamond (PKD), cubic boron nitride (CBN), CVD diamond, a cermet material or a fiber-reinforced plastic.

3. The tool according to claim 1, wherein at least sections of the fitting groove are used for adhesive bonding.

4. The tool according to claim 1, wherein the adhesive layer comprises an adhesive film.

5. The tool according to claim 1, wherein the adhesive layer comprises an adhesive imprint.

6. The tool according to claim 1, wherein the cutting insert has a structure in which a ratio of the thickness of a cutting material layer divided by the overall thickness of the cutting insert is between 0.20 and 0.70.

7. The tool according to claim 1, wherein the cutting holder comprises a tool body.

8. The tool according to claim 1, wherein the cutting holder comprises a cutting plate.

9. The tool according to claim 1, wherein the cutting insert holder and/or the cutting insert is made at least partially out of a fiber-reinforced plastic.

10. The tool according to claim 1, wherein the cutting insert holder is a single piece.

11. The tool according to claim 1, wherein the tool comprises multiple parts, wherein at least one base surface holding a cutting edge is made out of a fiber-reinforced plastic.

12. The tool according to claim 11, wherein the cutting part is connected with the base body or a holding body arranged between the base body and the cutting insert.

13. The tool according to claim 1, wherein the tool comprises an internal coolant and/or lubricant supply channel system.

14. The tool according to claim 11, wherein the fiber-reinforced plastic comprises carbon fiber-reinforced plastic (CFC) and carbon fiber-reinforced carbon (CFC).

15. The tool according to claim 1, wherein the adhesive layer has a thickness within the tolerance range for the dimensional accuracy of the cutting edge.

16. The tool according to claim 1, wherein the fitting groove and/or at least a contact surface of the cutting insert holder that fixes the cutting insert in position has at least one pocket, in which adhesive that proves excessive during the assembly process can be accommodated.

17. A method for manufacturing a tool, comprising:
  machining a plate-shaped cutting insert to its final dimensions, which at least in sections comprises impact and/or wear-resistant cutting material, and essentially has the shape of a prism,
  placing the cutting insert with a base surface of its prism onto a contact surface of a cutting insert holder with an adhesive layer interspersed, the cutting insert holder having a cutting end, a shank end opposite the cutting end, an outer surface, an axis, and a fitting groove, the fitting groove having at least a first surface, a second surface and a third surface, the first surface and the second surface spaced from each other, the third surface bounded by a first edge, a second edge, a third edge, and a fourth edge, the first edge of the third surface extending along an edge of the first surface, the second edge of the third surface extending along an edge of the second surface, the third edge of the third surface toward the cutting end relative to the fourth edge of the third surface, the fourth edge of the third surface toward the shank end relative to the third edge of the third surface, a first portion of the third surface extending in a first direction through only a portion of the cutting insert holder toward the shank end of the cutting insert holder, and a second portion of the third surface diverging from the first direction and extending in a second direction to the outer surface of the cutting insert holder,
  pushing the cutting insert into the fitting groove of the cutting insert holder until a jacket surface arrangement of the prism adjacent to the cutting edge stops against corresponding mating surfaces of the cutting insert holder for spatially fixing the cutting edge, and
  curing the adhesive while maintaining the jacket surface arrangement against corresponding mating surfaces of the cutting insert holder.

18. The tool according to claim 1, wherein the cutting insert comprises a cutting material layer and a ratio of a thickness of the cutting material layer divided by the overall thickness of the cutting insert is between 0.45 and 0.55.

19. The tool according to claim 1, wherein the cutting insert holder and/or the cutting insert is made entirely out of a fiber-reinforced plastic.

20. The tool according to claim 1, wherein the adhesive layer has a thickness of between 5 and 100 μm.

21. The tool according to claim 1, wherein the third surface traces a curve from the first length portion to the second portion.

22. A machining tool comprising:
  at least one plate-shaped cutting insert, which at least in sections comprises an impact and/or wear-resistant cutting material; and
  a cutting insert holder,
  the cutting insert holder having a pocket,
  the pocket having a radially innermost surface and a fitting groove, the fitting groove in the radially innermost surface,
  the fitting groove having a linear length that extends through only a portion of the cutting insert holder,
  the cutting insert comprising a base surface and a cutting edge,
  the cutting insert bonded by a contact surface arrangement with the cutting insert holder directly via an adhesive layer,
  the cutting insert essentially having the shape of a prism,
  the cutting insert secured to the cutting insert holder in such a way that:
  a) a base surface of the prism is adhesively bonded with the cutting insert holder over essentially an entire surface of the base surface;
  b) a jacket surface arrangement of the prism adjacent to the cutting edge is drawn to the cutting insert holder for spatially fixing the cutting edge;
  c) a section of the jacket surface arrangement is caught in the fitting groove of the cutting insert holder; and
  d) the cutting insert extends radially beyond the radialmost portion of the pocket.

23. The tool according to claim 1, wherein the groove has a base surface connecting two opposing surfaces, the two opposing surfaces defining the width of the groove, and wherein a section of the jacket surface arrangement being caught in the fitting groove of the cutting insert holder comprises the section of the jacket surface arrangement being between the opposing surfaces in the first portion of the length of the fitting groove and in the second portion of the length of the fitting groove.

\* \* \* \* \*

UNITED STATES PATENT AND TRADEMARK OFFICE
CERTIFICATE OF CORRECTION

PATENT NO.         : 9,056,357 B2
APPLICATION NO.    : 13/759568
DATED              : June 16, 2015
INVENTOR(S)        : Lutfi Bozkurt Page 1 of 1

It is certified that error appears in the above-identified patent and that said Letters Patent is hereby corrected as shown below:

Title Page, Foreign Patent Documents, Page 2

Please change: "DE 20 2005 000 9 6/2006" to -- DE 20 2005 000 994 6/2006 --

Claims

Claim 21, Col. 12, Line 9

Please change: "traces a curve from the first length portion to the second" to -- traces a curve from the first portion to the second --

Signed and Sealed this
Twenty-ninth Day of December, 2015

Michelle K. Lee
*Director of the United States Patent and Trademark Office*